(12) United States Patent  (10) Patent No.: US 7,517,117 B2
Moreland et al. (45) Date of Patent: Apr. 14, 2009

(54) CAM LOCK FOR TRACK SYSTEMS

(75) Inventors: Karren Moreland, Phoenix, AZ (US); Phillip D. Moreland, Phoenix, AZ (US)

(73) Assignee: Kmor Innovations, Inc., Phoenix, AZ (US)

( * ) Notice: Subject to any disclaimer, the term of this patent is extended or adjusted under 35 U.S.C. 154(b) by 0 days.

(21) Appl. No.: 10/647,726

(22) Filed: Aug. 25, 2003

(65) Prior Publication Data

US 2005/0047852 A1   Mar. 3, 2005

(51) Int. Cl.
    *F21V 21/08* (2006.01)
(52) U.S. Cl. .................. 362/391; 362/396; 403/253; 403/257; 403/350
(58) Field of Classification Search ......... 403/252–257, 403/348, 350; 411/84, 85, 549, 553; 362/226, 362/147, 249, 252, 391, 396
    See application file for complete search history.

(56) References Cited

U.S. PATENT DOCUMENTS

| 2,121,492 | A |   | 6/1938  | St. John |           |
|-----------|---|---|---------|----------|-----------|
| 2,676,680 | A |   | 4/1954  | Kindorf  |           |
| 2,692,375 | A | * | 10/1954 | Carson   | ... 362/391 |
| D175,485  | S | * | 8/1955  | Weiss    | ... D8/367 |
| 2,859,057 | A |   | 11/1958 | Elsner   |           |
| 3,523,669 | A |   | 8/1970  | Avallone |           |
| 3,608,484 | A |   | 9/1971  | Bubley   |           |
| 3,986,780 | A |   | 10/1976 | Nivet    |           |
| 4,182,532 | A | * | 1/1980  | Walker, Sr. | ... 362/549 |
| 4,471,415 | A | * | 9/1984  | Larson et al. | ... 362/249 |
| 4,919,625 | A | * | 4/1990  | Coutre   | ... 439/118 |
| 5,141,192 | A | * | 8/1992  | Adams    | ... 248/231.81 |
| 5,364,150 | A |   | 11/1994 | Cochran et al. |    |
| 5,669,198 | A |   | 9/1997  | Ruff     |           |
| 5,669,709 | A | * | 9/1997  | Adams    | ... 362/396 |
| 6,086,300 | A |   | 7/2000  | Frohlich |           |
| 6,364,508 | B1| * | 4/2002  | Moreland | ... 362/249 |
| 6,588,711 | B2| * | 7/2003  | Onishi   | ... 248/49 |
| 6,732,991 | B1| * | 5/2004  | Zakrzewski et al. | ... 248/317 |
| 6,733,221 | B2| * | 5/2004  | Linger   | ... 411/84 |
| 7,159,998 | B2| * | 1/2007  | Moreland | ... 362/249 |

FOREIGN PATENT DOCUMENTS

EP       0047703      3/1982

* cited by examiner

*Primary Examiner*—Michael P Ferguson
(74) *Attorney, Agent, or Firm*—Louis J. Hoffman; David S. Alavi

(57) ABSTRACT

A lock has a preferably generally box-shaped body and a handle joined by and formed integrally with a narrower neck. The lock is useful for removably securing, without the need for semi-permanent attachments, Christmas light strings or other objects into a track system, which can run along the exterior of a structure. The body preferably can be rectangular in cross-section with rounded corners and slanted side walls and is dimensioned such that the manually turned handle rotates the body to press snugly against the inside walls of the track in one direction and fit loosely in the other direction.

14 Claims, 17 Drawing Sheets

CAM LOCK FOR TRACK SYSTEMS

FIELD OF THE INVENTION

The present invention relates to the field of ornament or light string locking devices designed for use with track system. More specifically the present invention relates to the field of cam based locking devices that removably secure light strings and other objects to or in track systems.

BACKGROUND

It has become common practice to decorate homes, businesses, or other buildings during holiday seasons, such as Christmas, Halloween, Easter, and the like, by attaching strings of lights to achieve a decorative effect. The strings of lights are typically secured beneath overhanging eaves and around gables, and are also positioned to outline architectural features, whether interior or exterior, of the homes and businesses, such as windows, doorways, bars, and the like.

The strings of lights are usually secured in place by simple connectors such as staples, hooks, nails and the like. This method however, due to repetitive installation and removal of the staples, results in considerable marring of the wooden mounting surfaces and also can be dangerous because of potential damage to light string wires. Staples and other sharp objects are not a recommended method of installation but lacking other convenient methods of light string installation are used by many.

Long strings of lights, as are typically used, are difficult to install and consequently a householder is often inclined to leave the lights in place once they are secured. Although this avoids yearly installation and removal, the strings of lights are exposed to weather for the full year resulting in their early deterioration and, furthermore, they add nothing to, and in fact detract from, the appearance of a house between holiday seasons. Further, the permanently attached light strings may conveniently express only a single holiday.

Light holders have heretofore been devised for attachment to buildings for attaching strings of lights in a regular manner and which afford the light strings some protection from the weather. These light holders required periodic use of a ladder while installing and removing the holiday light strings. Alternately, if the lights are left in place, they are continuously exposed to view. Consequently, unless the homeowner is content to accept the detraction from the aesthetic qualities of this home, the holders must be installed and removed each holiday season, such as Christmas, Halloween, and the like.

SUMMARY OF THE INVENTION

It is an object of the present invention to provide a removable/relocatable device that is capable of securing/locking light strings or other objects into a fixed location in a track system.

The novel features that are considered characteristic of the invention are set forth with particularity in the appended claims. The invention itself, however, both as to its structure and its operation together with the additional objects and advantages thereof will best be understood from the following description of the preferred embodiment of the present invention when read in conjunction with the accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C. §112, paragraph 6 to define the invention. To the contrary, if the provisions of 35 U.S.C. §112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6. Moreover, even if the provisions of 35 U.S.C. §112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

DESCRIPTION OF PREFERRED EMBODIMENTS

Figure 1:
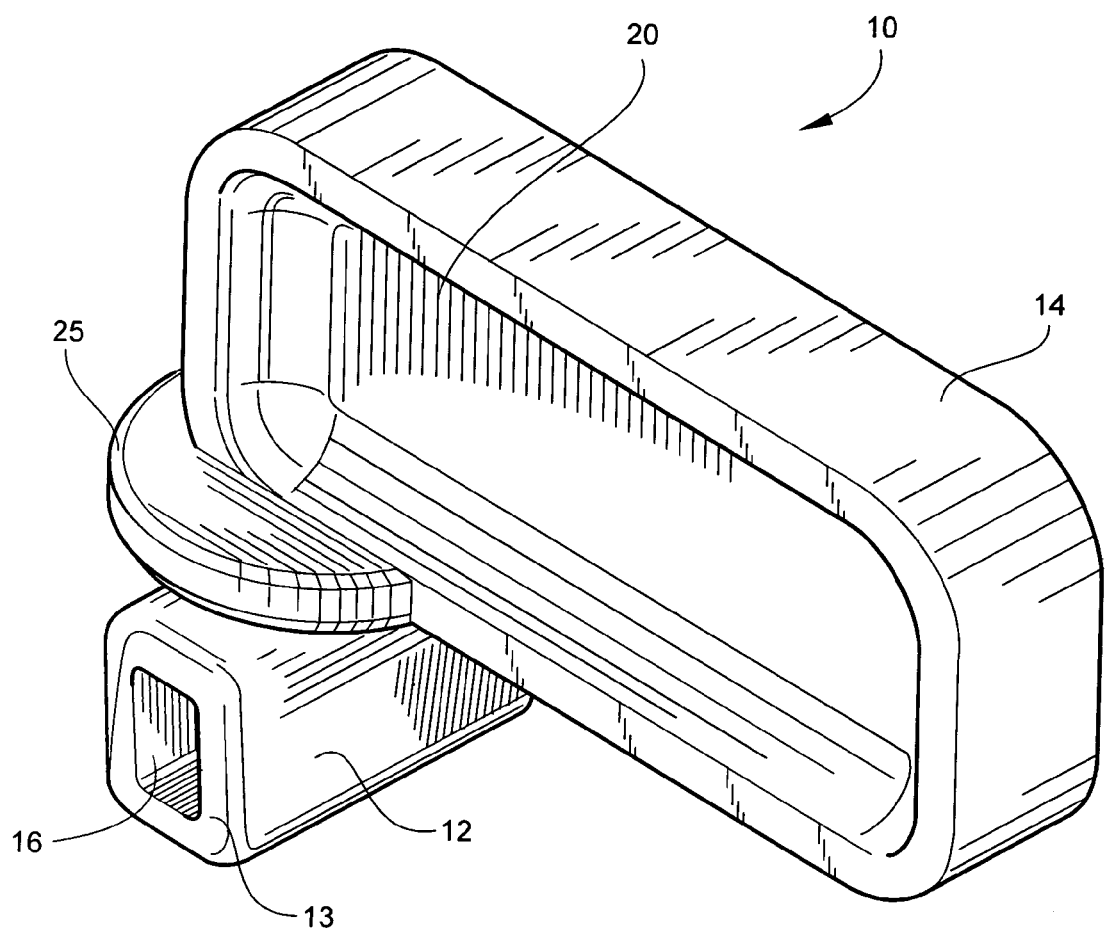
FIG. 1 is a perspective view of the device according to the present invention.
Figure 2:
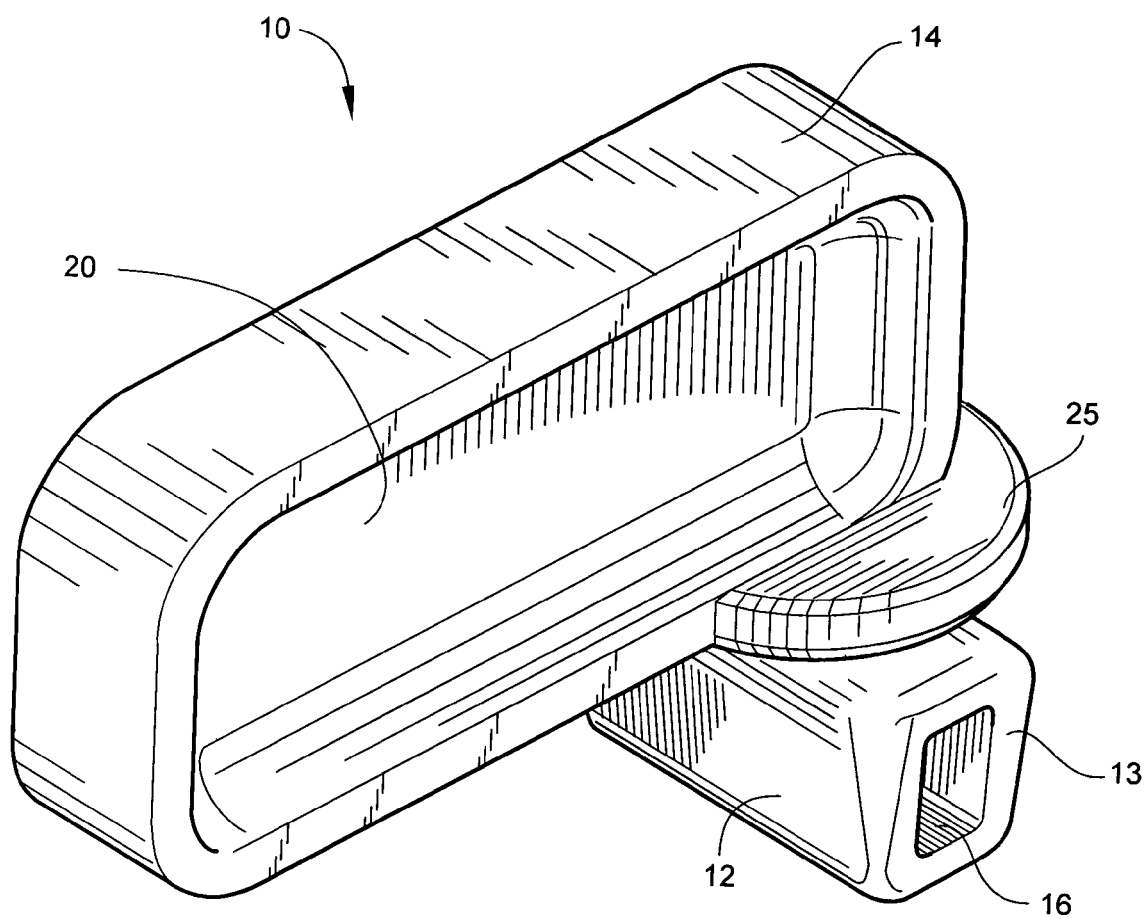
FIG. 2 is a second perspective view of the device according to the present invention.
Figure 3:
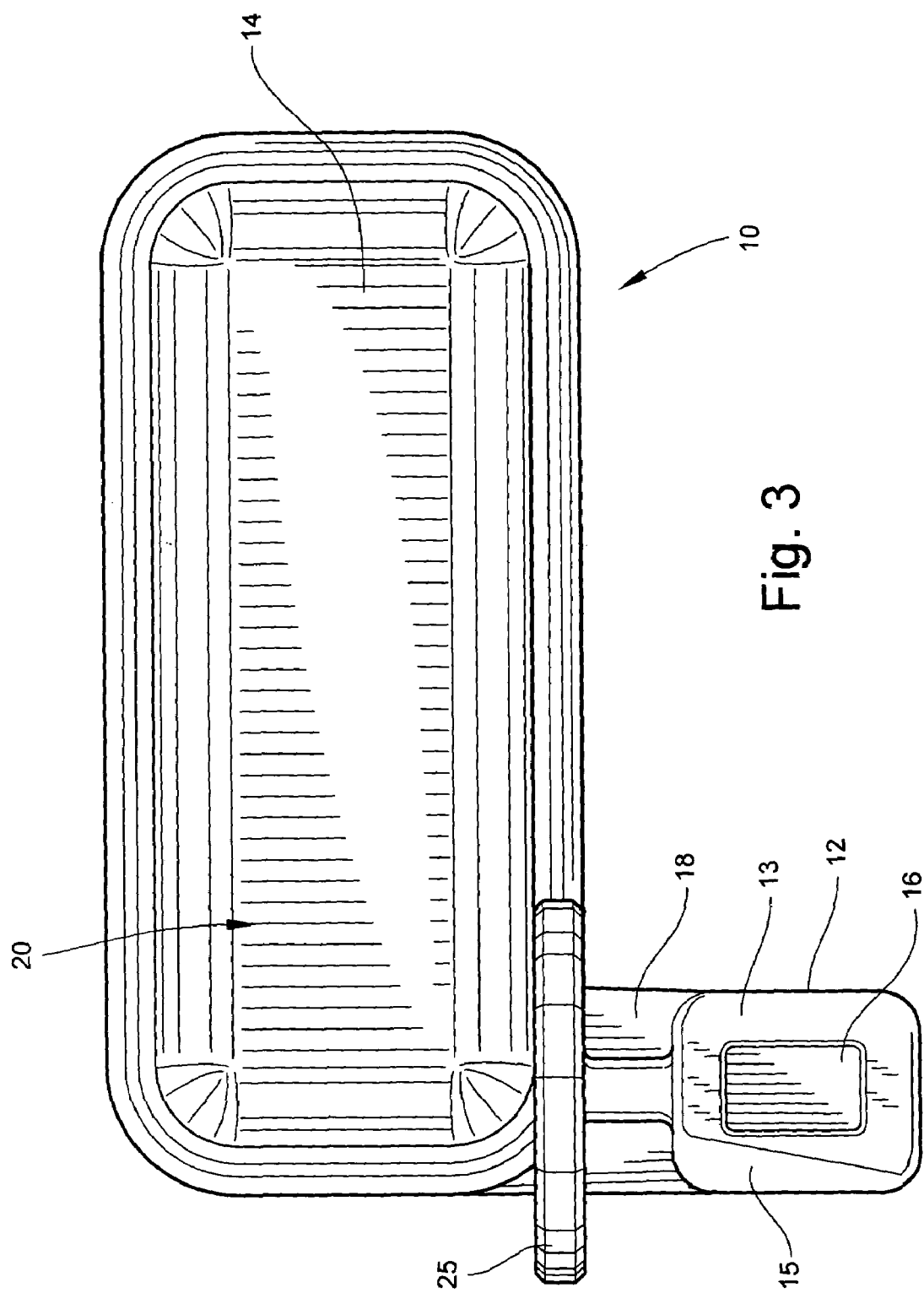
FIG. 3 is a side view of the device according to the present invention.
Figure 4:
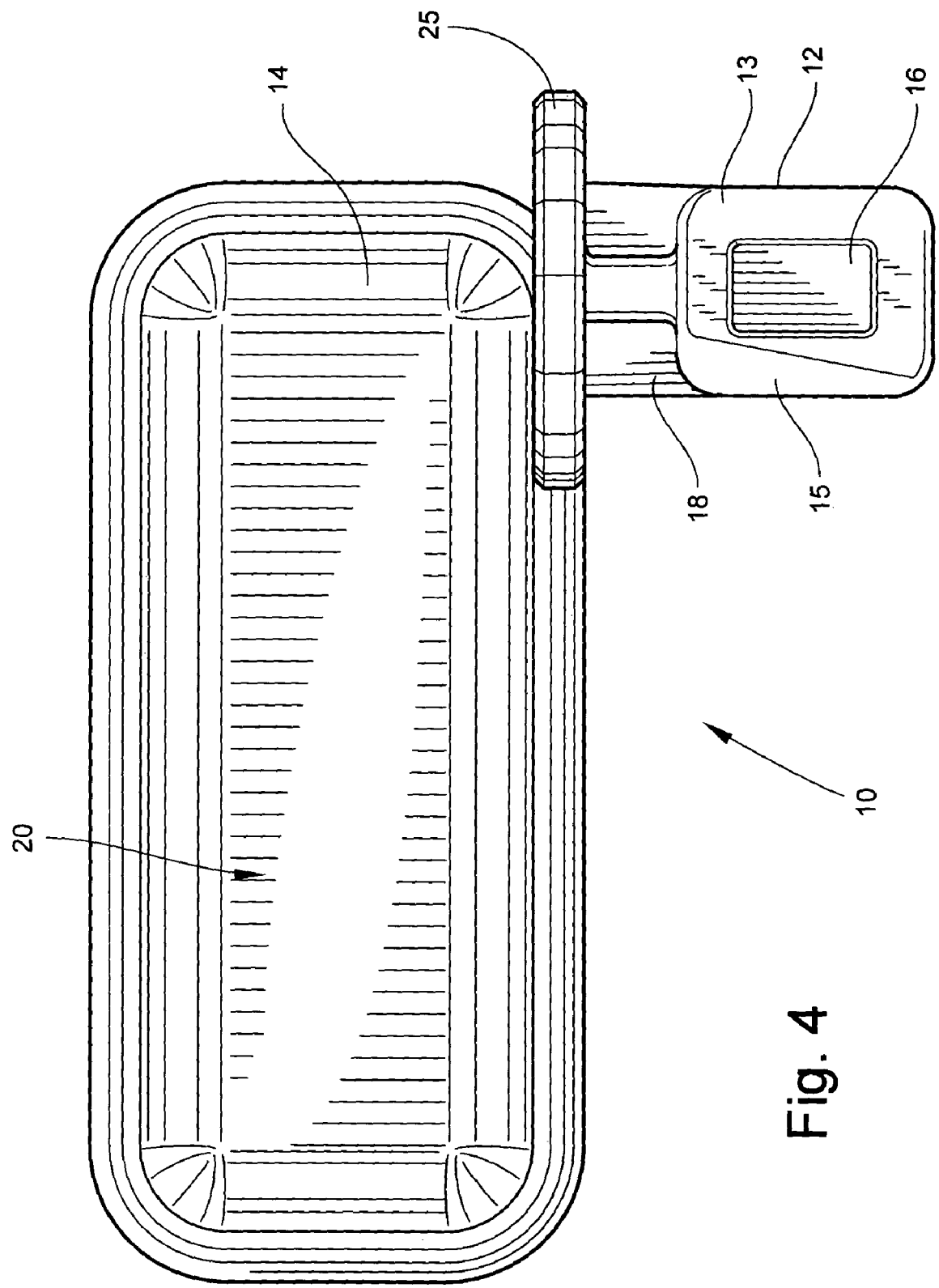
FIG. 4 is a second side view of the device according to the present invention.
Figure 5:
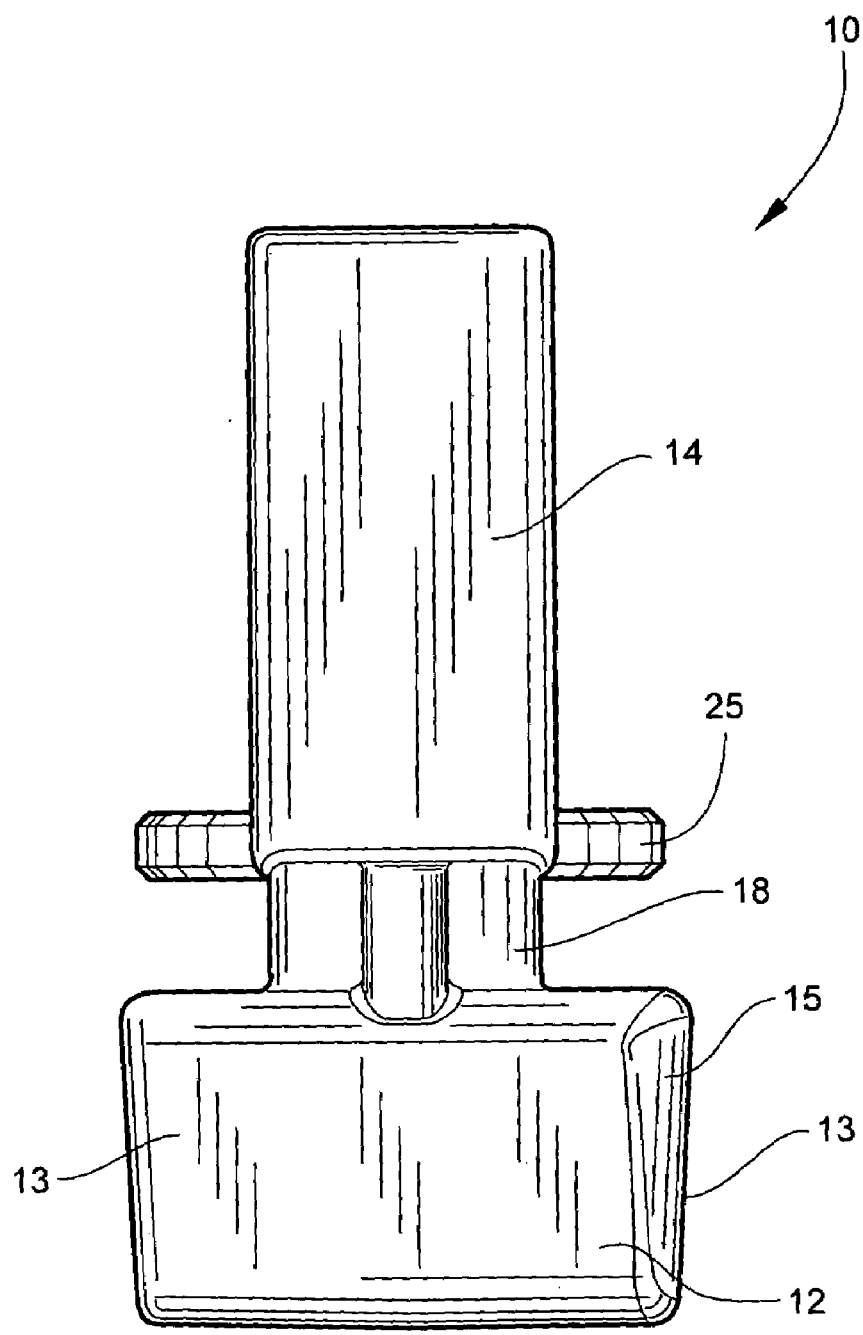
FIG. 5 is a third side view of the device according to the present invention.
Figure 6:
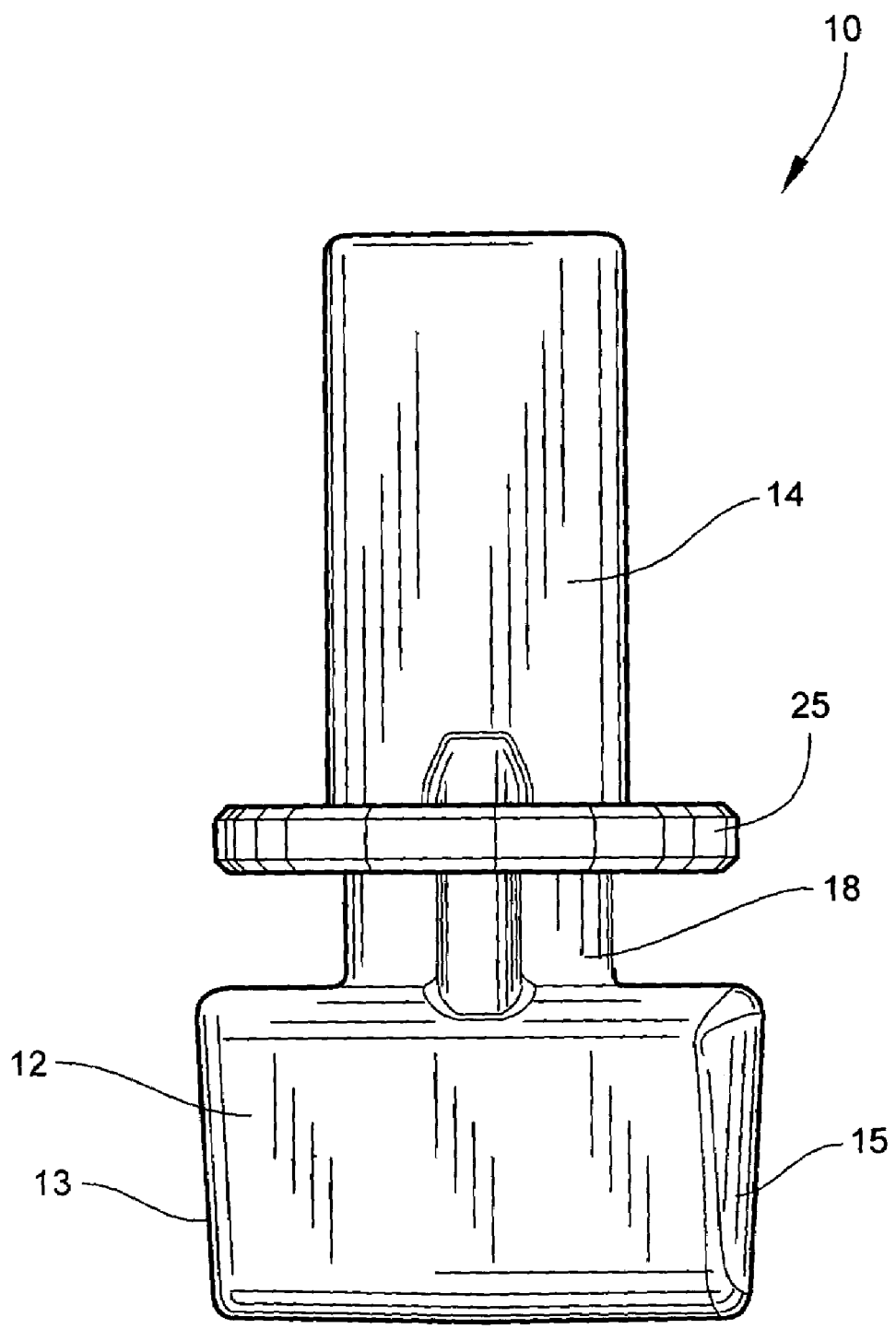
FIG. 6 is a fourth side view of the device according to the present invention.
Figure 7:
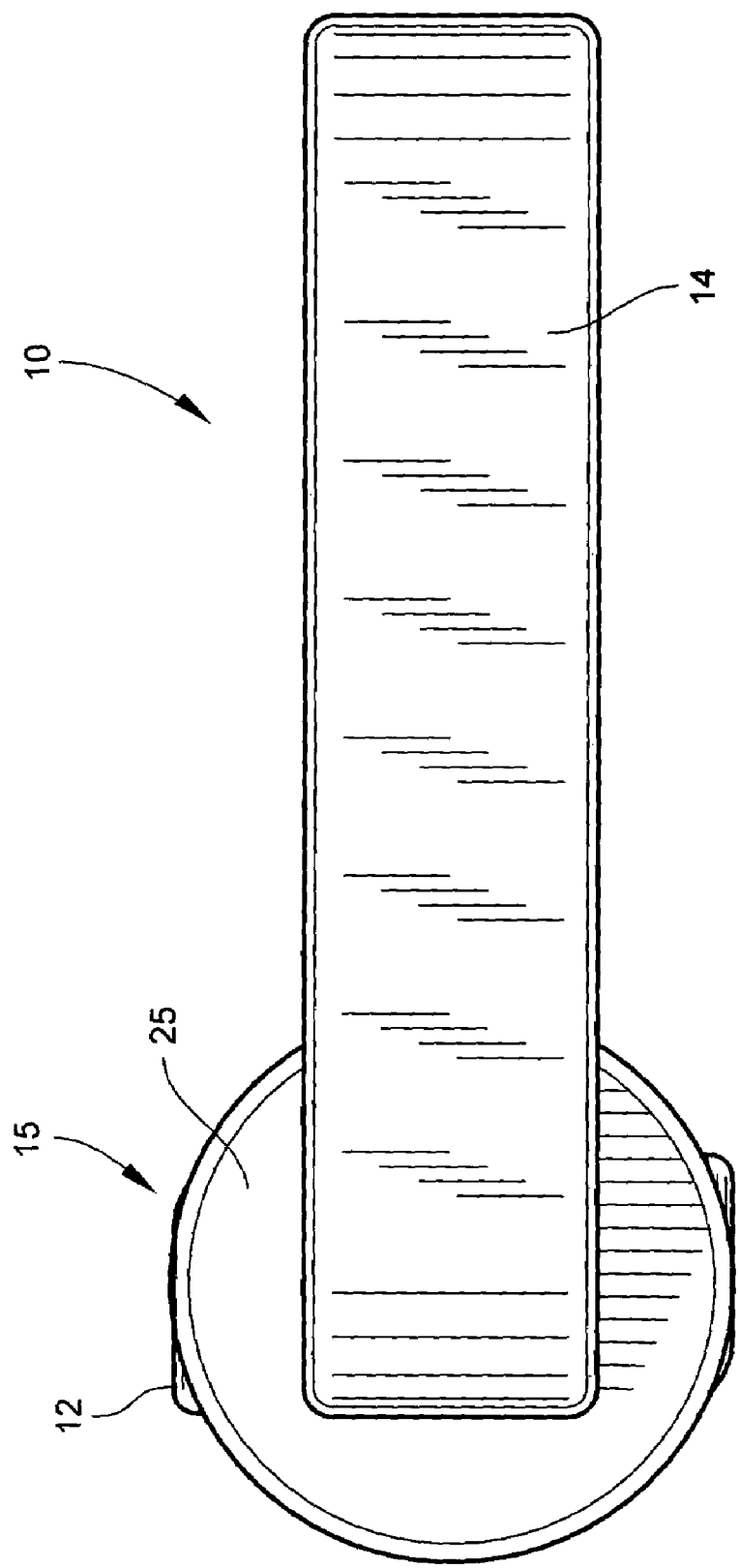
FIG. 7 is a top view of the device according to the present invention.
Figure 8:
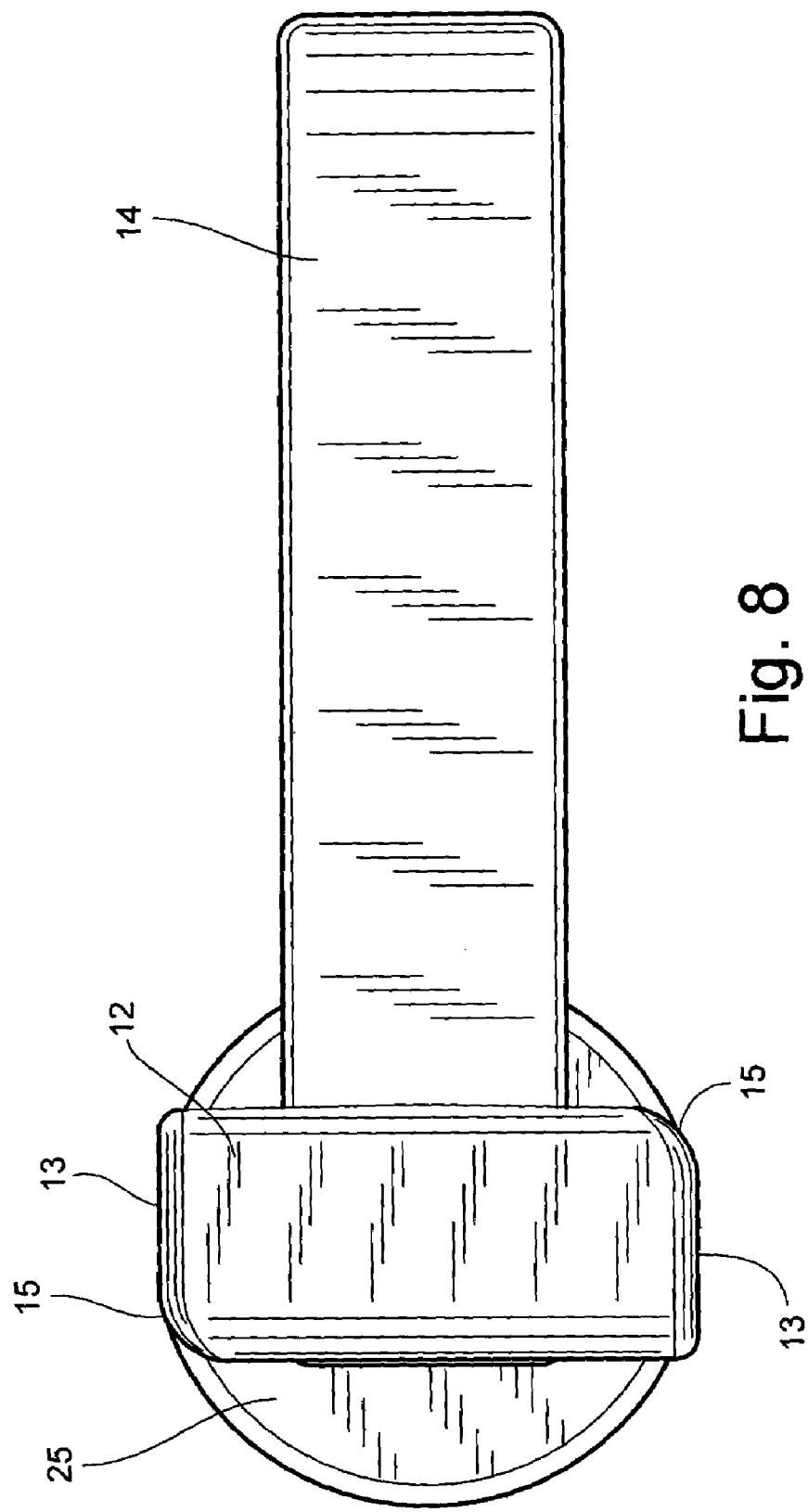
FIG. 8 is a bottom view of the device according to the present invention.

Referring now to the figures, the present invention is a lock 10 useful for removably securing/locking items into a track system.

The lock 10 according to the present invention has a body 12 with an attached handle portion 14. The body 12 is preferably a rectangular box in shape with, preferably, two opposed, cut-out sections 16. There is a downward portion 18 that projects from a mid-section of the body 12 and attaches to the handle portion 14.

It is critical that the body 12 of the lock 10 according to the present invention have a length that is substantially equal to the width of the track system into which the lock 10 is to be used. This ensures that when used, the body 12 will be able to fit within the track system with the appropriate snug fit. Sides 13 are angled relative to each other such that the portion of the body that attached to the downward portion 18 is wider than its opposite side. This allows the body 12, when rotated within a track of a track system, to force sides of the track outward. Further, at least one, preferably two edges 15 of the body 12 are rounded in order to allow the body 12 to more smoothly rotate with the track of the track system.

Preferably, the handle portion 14 is an elongated piece of a sufficient size to be securely grasped between two fingers of a user. Most preferably, the handle portion 14 is substantially rectangular in shape with opposed material saving cut-outs 20, however any other suitable shape is considered to fall within the scope of the present invention.

Finally, there may be included a stabilization collar 25 that is located on the handle portion 14 adjacent to the downward portion 18. This stabilization collar 25 may be circular in shape, as illustrated in the figures, it may extend the length of the handle (now shown), or other suitable shape may be used and still fall within the scope of the present invention.

Figure 9:
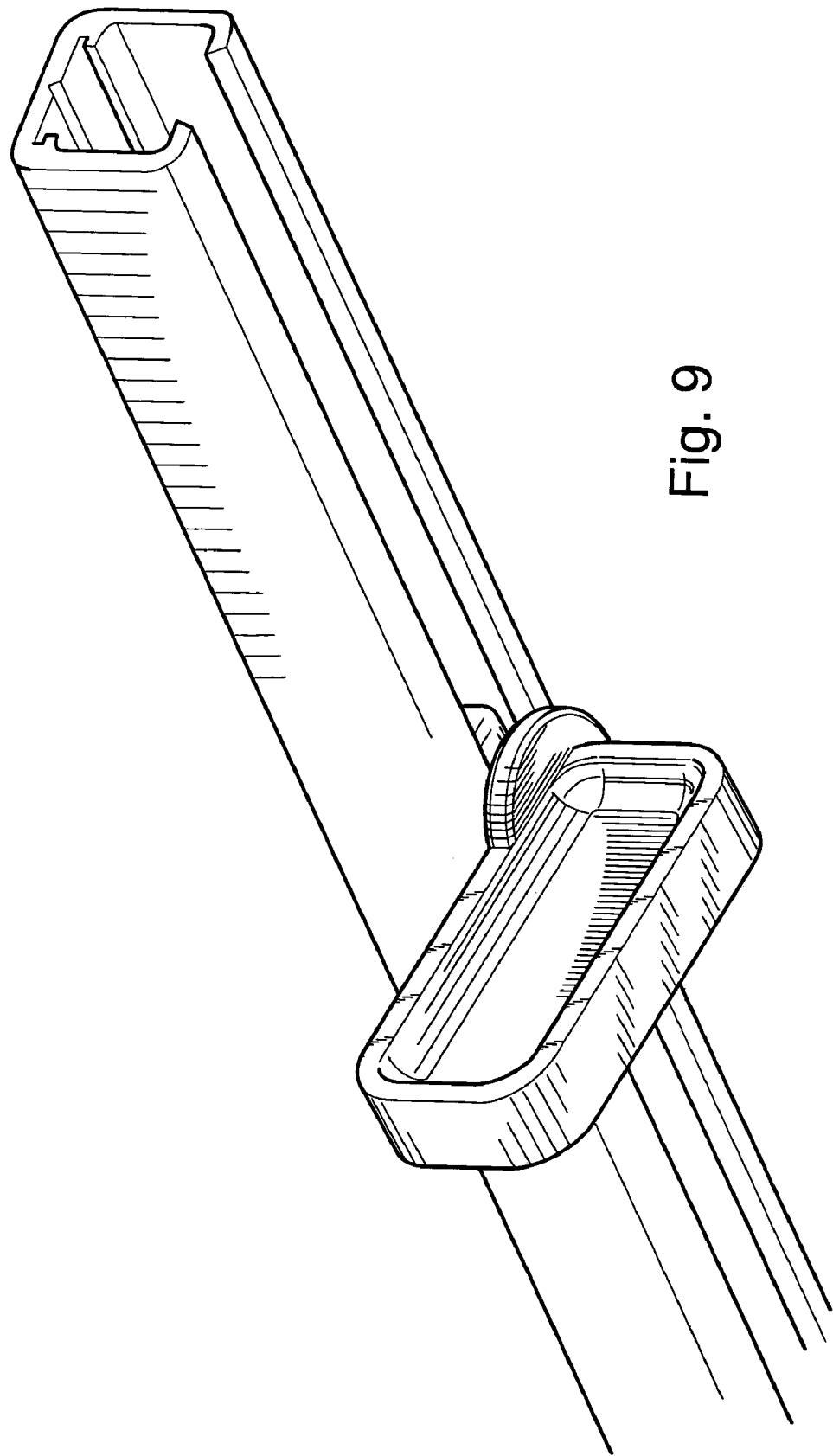
FIG. 9 illustrates use of the present invention in an unlocked position.
Figure 10:
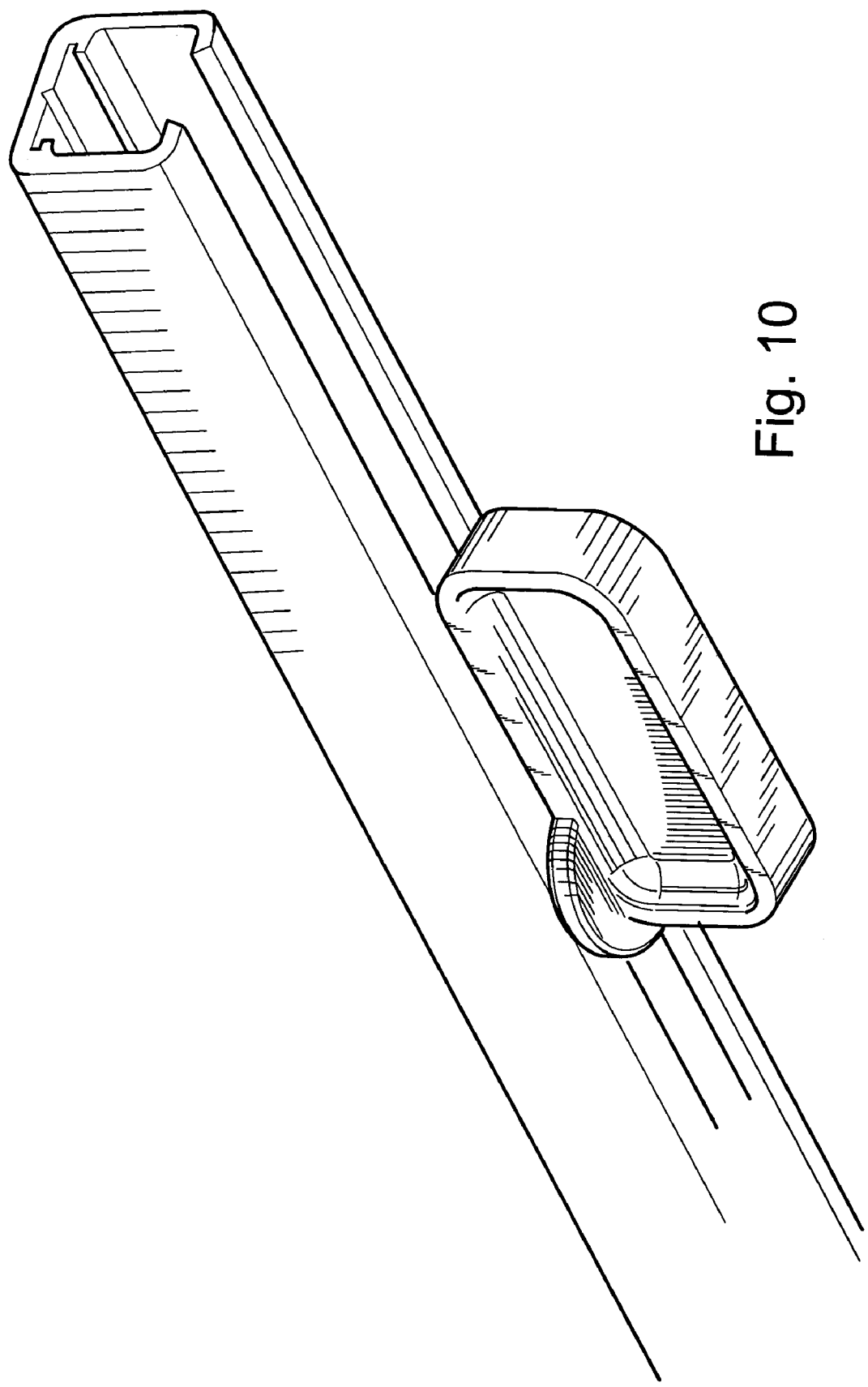
FIG. 10 Illustrates use of the present invention in a locked position.
Figure 11:
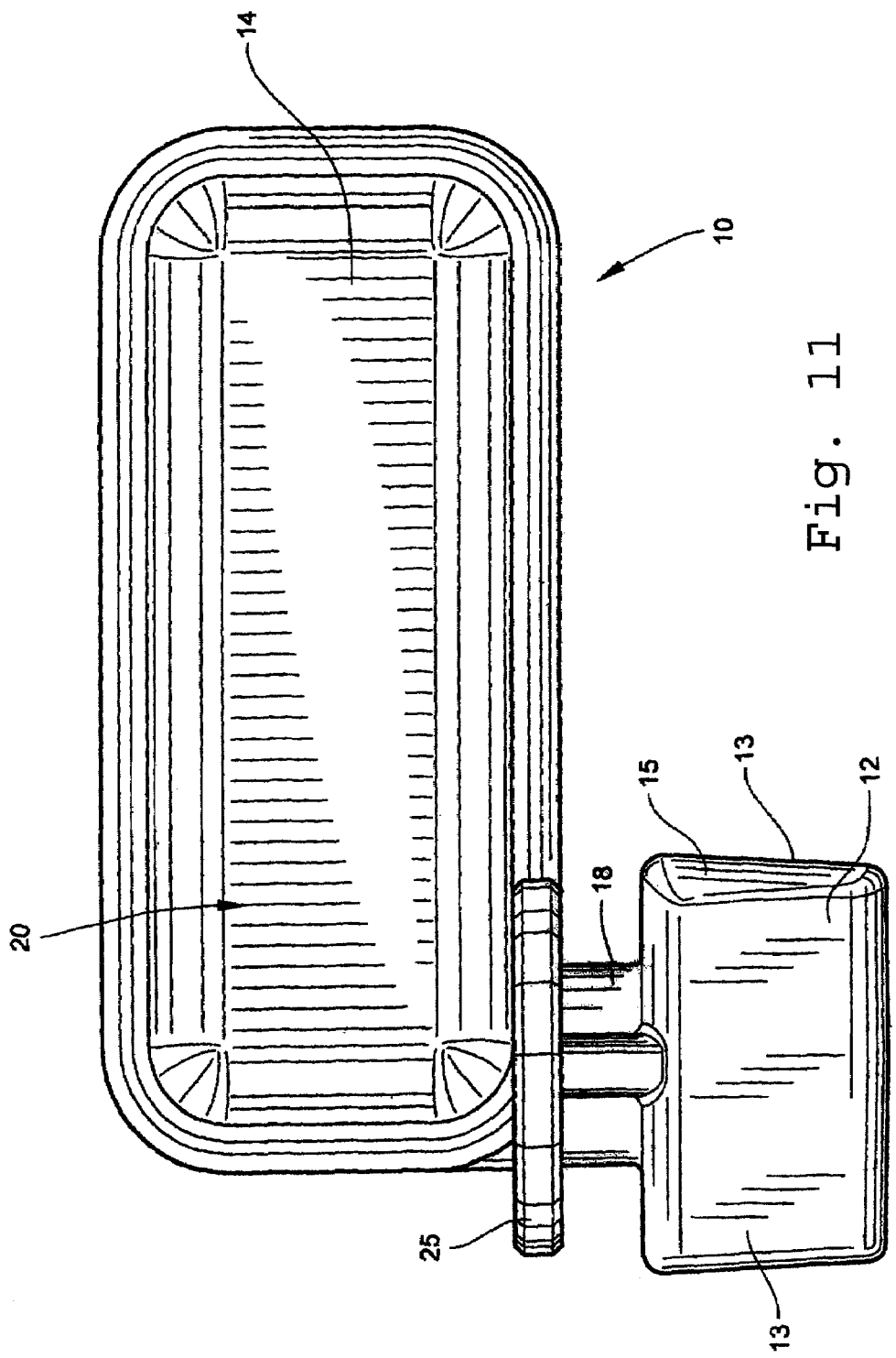
FIG. 11 is a side view of an alternative embodiment of the device according to the present invention.
Figure 12:
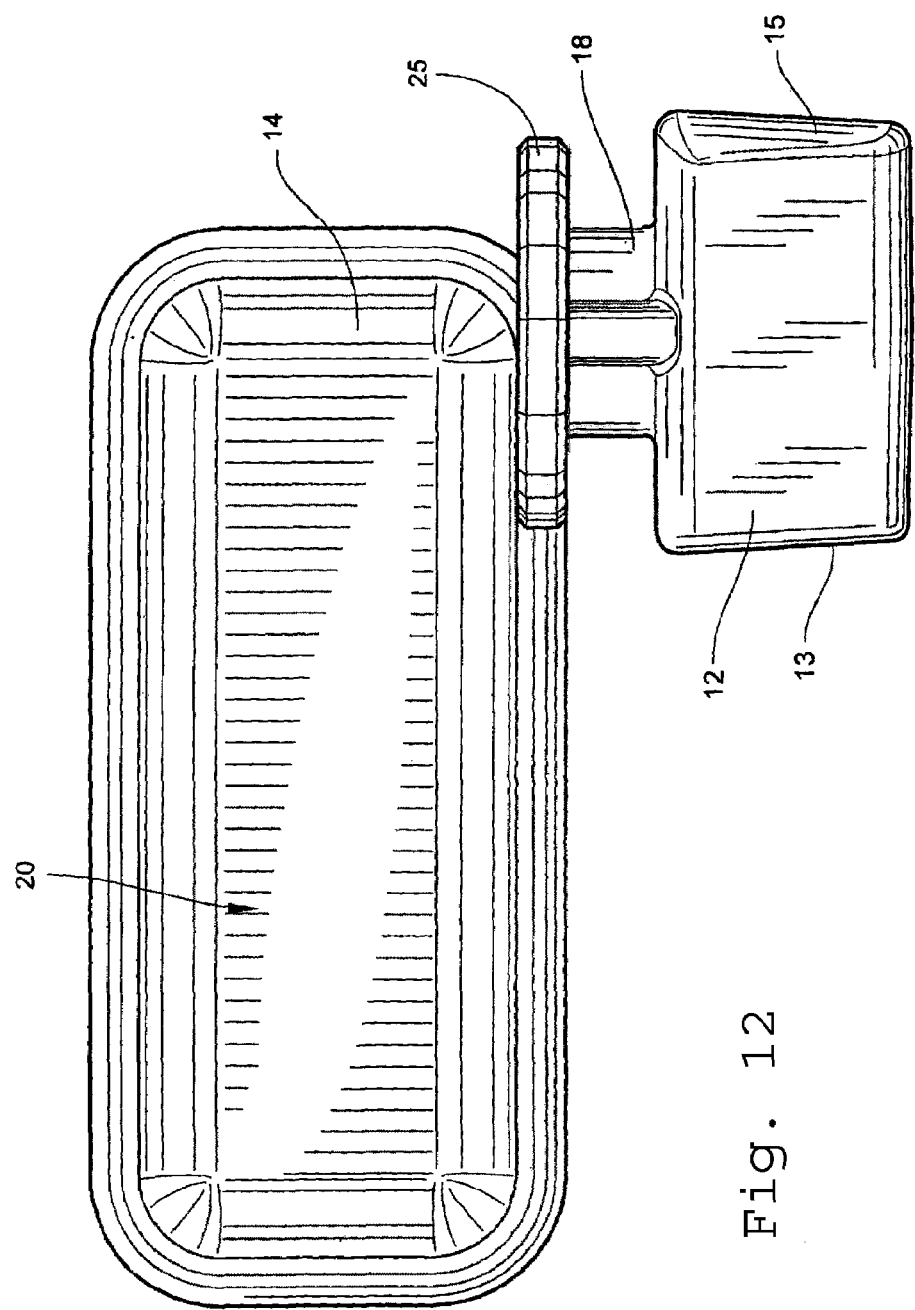
FIG. 12 is a second side view of an alternative embodiment of the device according to the present invention.
Figure 13:
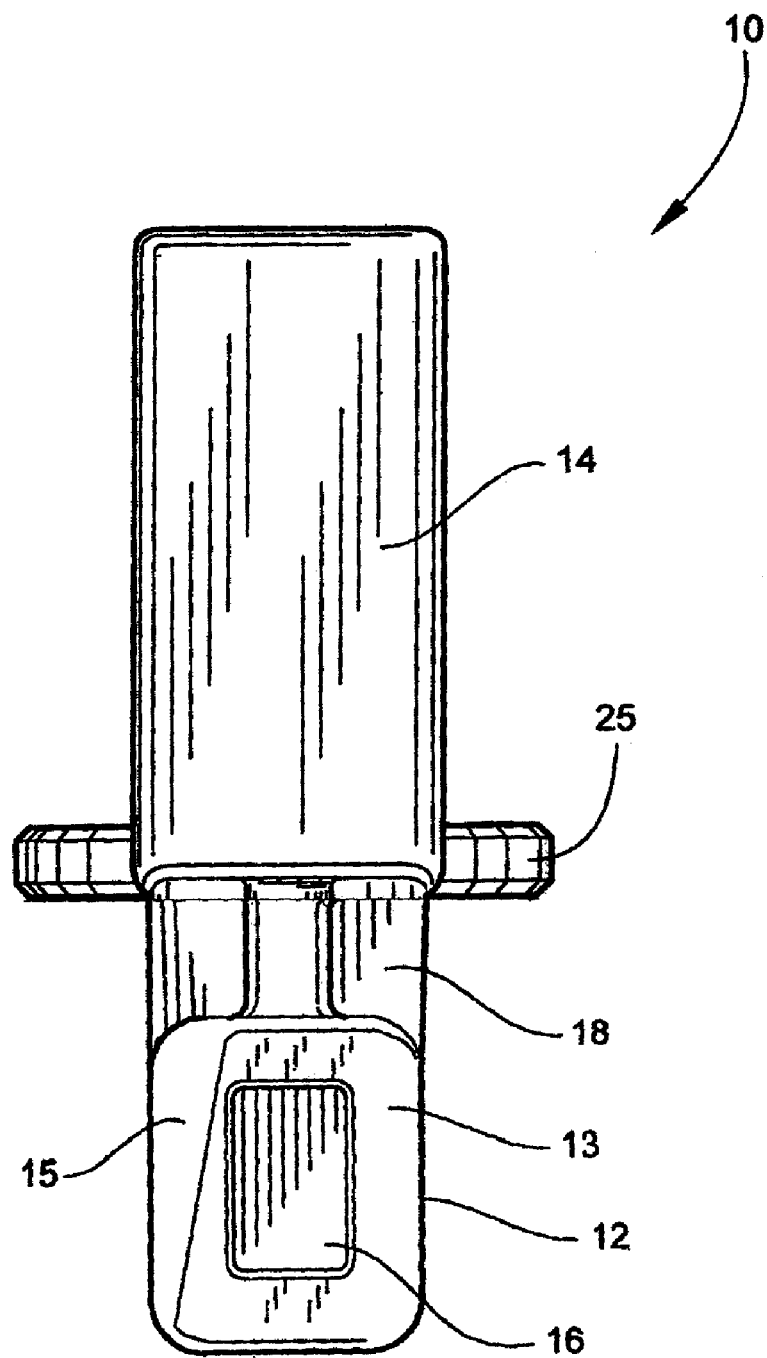
FIG. 13 is a third side view of an alternative embodiment of the device according to the present invention.
Figure 14:
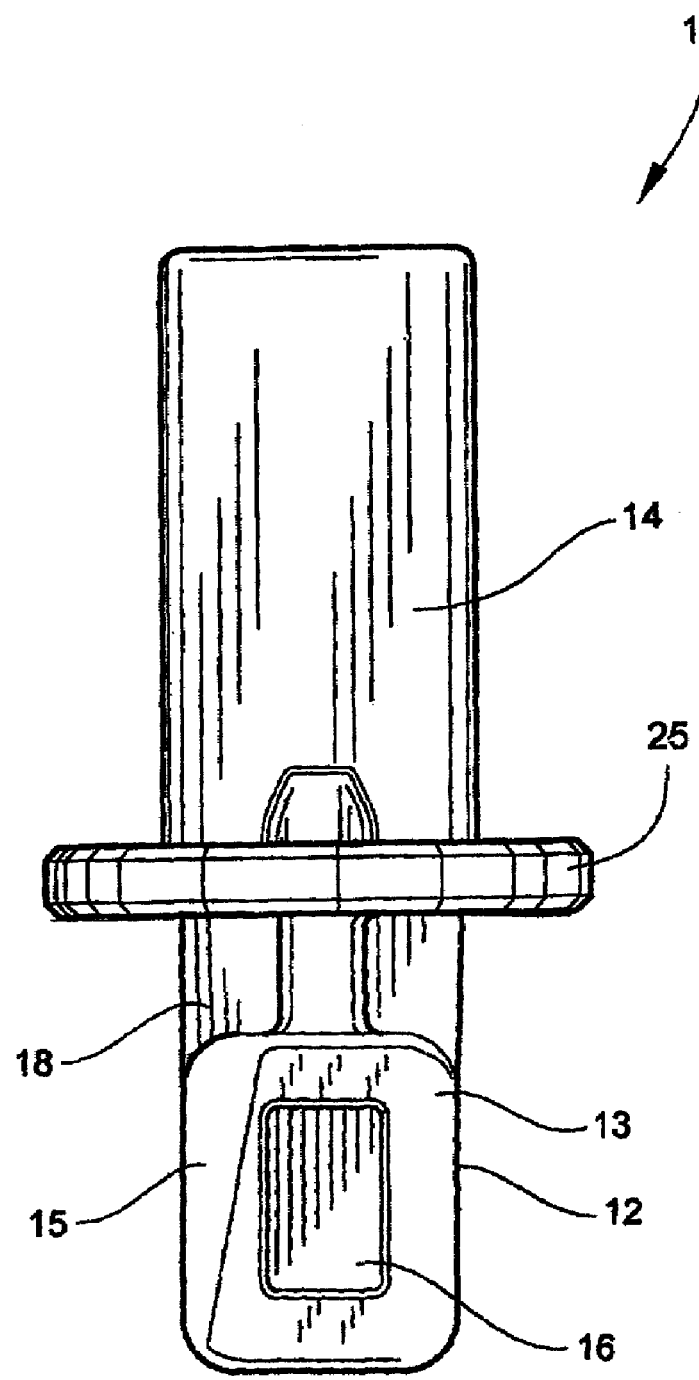
FIG. 14 is a fourth side view of an alternative embodiment of the device according to the present invention.
Figure 15:
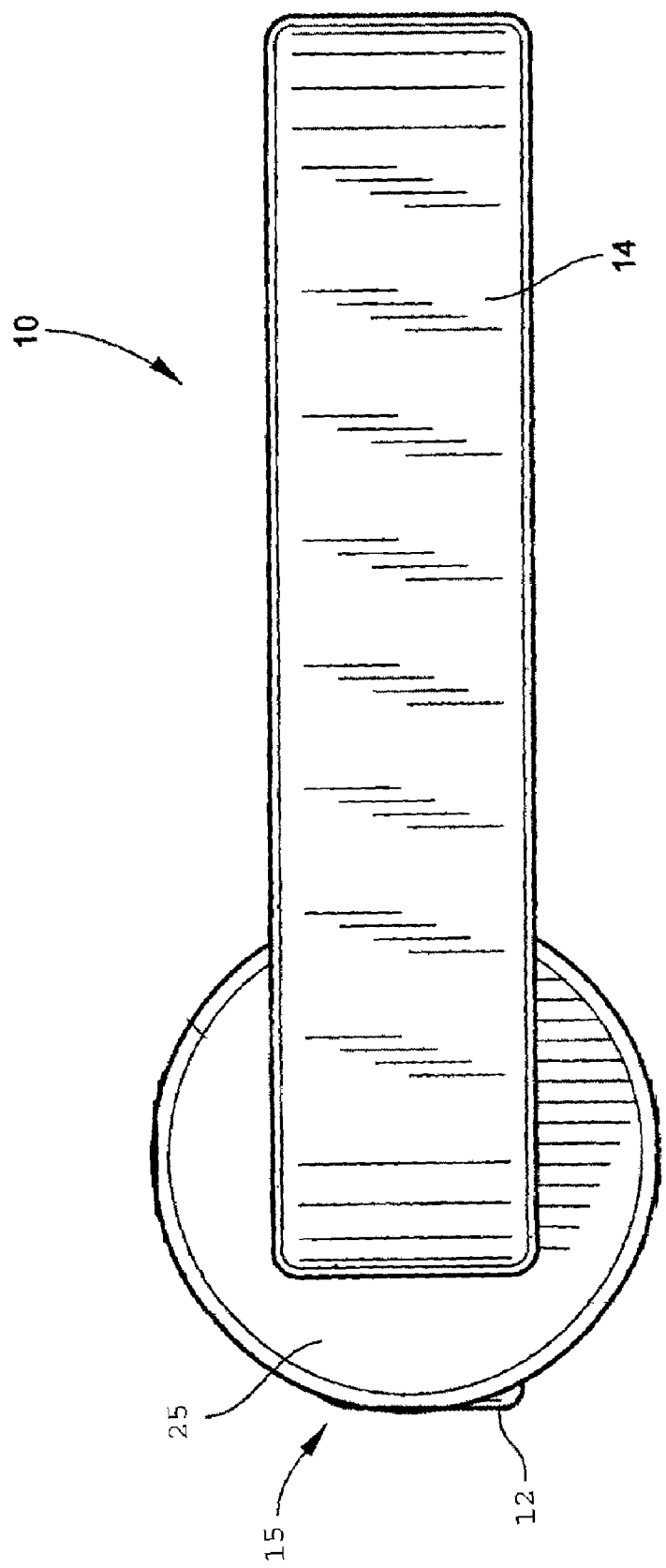
FIG. 15 is a top view of an alternative embodiment of the device according to the present invention.
Figure 16:
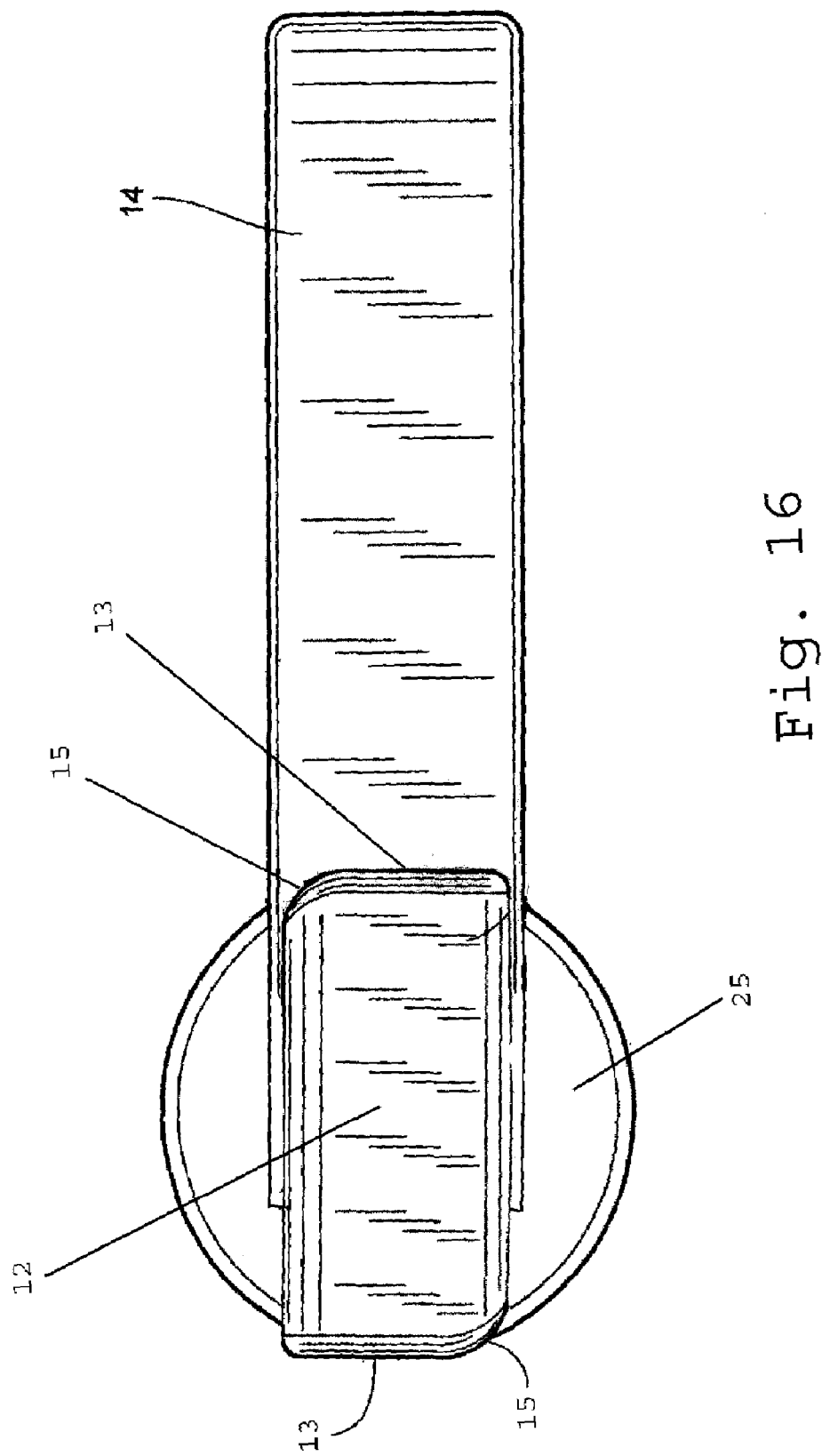
FIG. 16 is a bottom view of an alternative embodiment of the device according to the present invention.
Figure 17:
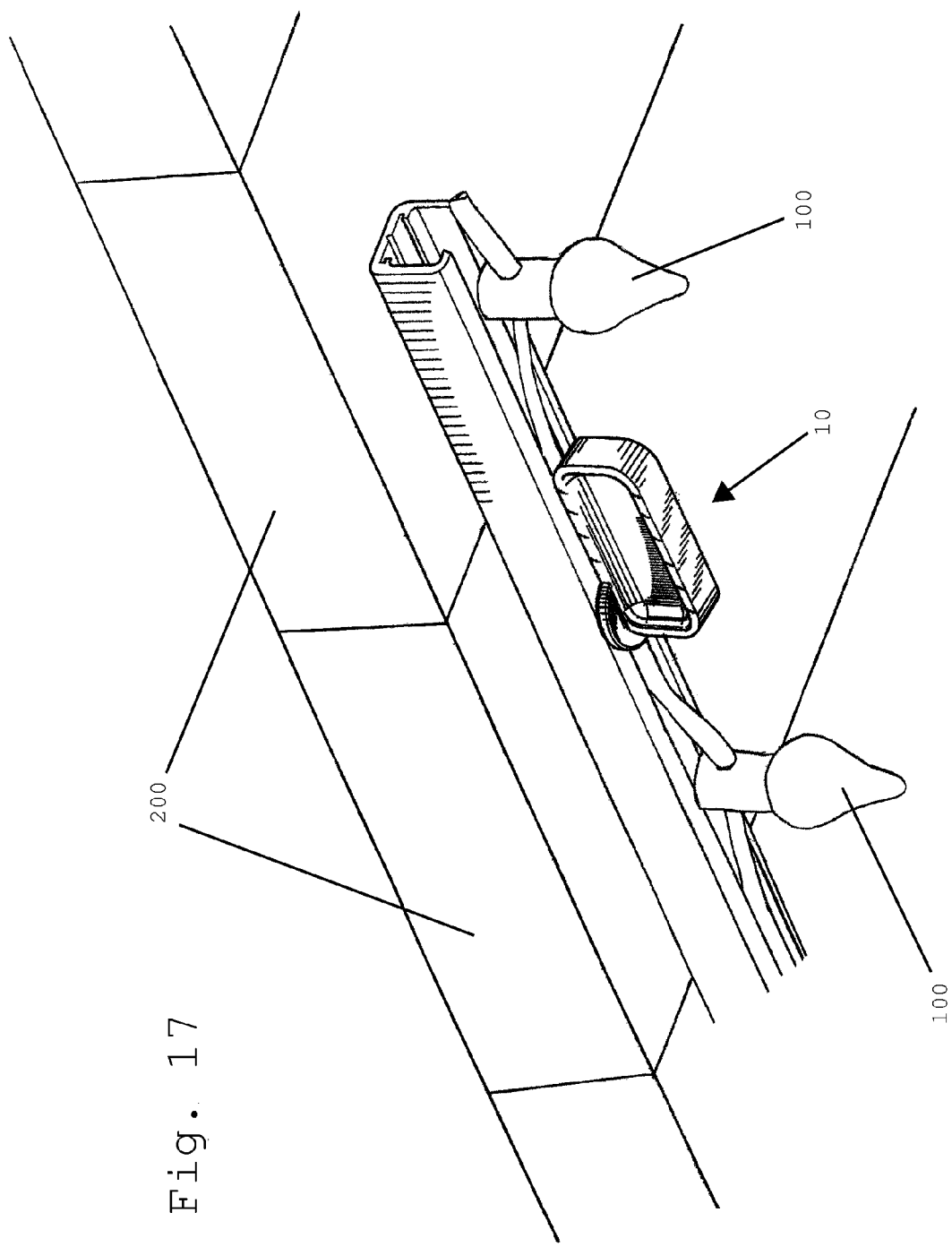
FIG. 17 illustrates use of a device according to the present invention to secure an item (e.g., a string of decorative lighting) into a track system.

In use, a portion of an item (e.g., a string of decorative lighting 100 as shown in FIG. 17) to be movably secured to the track system is placed in the track system. The track system can be secured, for example, to an overhanging eave 200 of a house (as in FIG. 17). The lock 10 according to the present invention is inserted into the track, adjacent to the item to be secured. The body 12 is, initially, aligned along the length of the track system (as in FIG. 9). The user grasps the handle portion 14 and rotates the entire lock 10 by 90 degrees (resulting in the arrangement shown in FIG. 10 and FIG. 17). This forces the body 12 into snug and secure position within the track system, thereby locking the light string or other object into place in the track system.

There are two primary embodiments contemplated by the instant invention. In the first primary embodiment the length of the handle portion 14 is oriented perpendicular to the length of the body 12 (as in FIGS. 1-10). Thus, when in place (where the body 12 is secure in the track), the handle portion 14 is aligned with the track system and thereby mostly inconspicuous. In the second primary embodiment the length of the handle portion 14 is oriented along the length of the body 12 (as in FIGS. 11-16. Thus, when in place, the handle portion 14 is oriented perpendicular to the length of the track system.

The preferred embodiment of the invention is described above in the Drawings and Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. A system comprising:
   (a) a track having a box-shaped cross-section with a longitudinal slot on one side of the box;
   (b) a one-piece lock comprising:
      (1) a body having a wider axis and a narrower axis;
      (2) a finger-turnable handle; and
      (3) a neck formed integrally with the body at one end and formed integrally with the handle at the other end;
      (4) wherein one end of the neck extends from the body in a direction generally perpendicular to a plane containing the wider axis and the narrower axis of the body;
      (5) wherein the neck is sized to extend through the slot;
      (6) wherein the body is sized to fit within the interior of the track so that the body can move along the track when the wider axis is parallel the longitudinal slot of to the track and to fit within the interior of the track with opposing ends of the body frictionally engaged with opposing side walls of the track when the narrower axis is parallel the longitudinal slot of to the track; and
      (7) wherein the narrower axis of the body is no wider than the slot to enable the body to pass through the slot when the wider axis is parallel to the longitudinal slot; and
   (c) a string of lights arranged along the track,
   (d) wherein the body of the lock is positioned within the track with its opposing ends frictionally engaged with opposing side walls of the track, which frictional engagement holds the lock in a substantially fixed longitudinal position along the track;
   (e) wherein an interior portion of the track and a surface of the frictionally engaged body opposite the neck together define a circumscribed passage within the track;
   (f) wherein a segment of a wire of the string of lights passes through the circumscribed passage and is retained within the track by the body of the lock; and
   (g) wherein a light of the string is outside the track so that the wire passes through the slot at a location between the segment of wire that passes through the circumscribed passage and the light.

2. The system of claim 1 wherein the track is secured to a house.

3. The system of claim 1 wherein the handle is elongated and parallel to the narrower axis of the body.

4. The system of claim 1 wherein the handle is elongated and parallel to the wider axis of the body.

5. The system of claim 1 wherein, measured along the intersection of the body and a plane passing through the neck, a first side of the body adjacent to the neck is wider than an opposing side of the body.

6. The system of claim 1 wherein the body comprises two rounded edges at opposite corners of a generally box-shaped body to enable the body to pass through the slot when the wider axis is parallel to the longitudinal slot, which edges are parallel to the neck.

7. The system of claim 1 wherein:
(a) the handle is elongated and the neck is formed integrally with the handle at a point near one end of the handle;
(b) the neck defines and surrounds a rotation axis of the lock, which axis is generally perpendicular to the plane containing the wider axis and the narrower axis of the body; and
(c) the elongated handle is arranged substantially perpendicular to the rotation axis and extends substantially continuously across the axis.

8. A method comprising:
(a) arranging a string of lights along a track, which track has a box-shaped cross-section with a longitudinal slot on one side of the box, with a segment of a wire of the string of lights inside the track and with a light of the string of lights outside the track;
(b) inserting a portion of a one-piece lock through the slot into the track at a location along the track where the segment of wire is inside the track, which one-piece lock comprises:
  (1) a body that has a wider axis and a narrower axis;
  (2) a finger-turnable handle; and
  (3) a neck formed integrally with the body at one end and formed integrally with the handle at the other end;
  (4) wherein one end of the neck extends from the body in a direction generally perpendicular to a plane containing the wider axis and the narrower axis of the body;
  (5) wherein the neck is sized to extend through the slot;
  (6) wherein the body is sized to fit within the interior of the track, so that the body can move along the track when the wider axis is parallel to the longitudinal slot of the track and to fit within the interior of the track with opposing ends of the body frictionally engaged with opposing side walls of the track when the narrower axis is parallel to the longitudinal slot of the track; and
  (7) wherein the narrower axis of the body is no wider than the slot to enable the body to pass through the slot when the wider axis is parallel to the longitudinal slot; and
(c) thereafter, turning the lock to frictionally engage the body within the track (i) so as to hold the lock in a substantially fixed longitudinal position along the track, thereby forming a circumscribed passage defined by an interior portion of the track and a surface of the frictionally engaged body opposite the neck, (ii) so that the segment of wire is retained within the track and passes through the circumscribed passage, and (iii) so that the wire passes through the slot at a location between the wire segment passing through the circumscribed passage and the light.

9. The method of claim 8 further comprising securing the track to a house.

10. The method of claim 8 wherein the handle is elongated and parallel to the narrower axis of the body.

11. The method of claim 8 wherein the handle is elongated and parallel to the wider axis of the body.

12. The method of claim 8 wherein, measured along the intersection of the body and a plane passing through the neck, a first side of the body adjacent to the neck is wider than an opposing side of the body.

13. The method of claim 8 wherein the body comprises two rounded edges at opposite corners of a generally box-shaped body one edge at each opposing end of the body, which edges are parallel to the neck.

14. The method of claim 8 wherein:
(a) the handle is elongated and the neck is formed integrally with the handle at a point near one end of the handle;
(b) the neck defines and surrounds a rotation axis of the lock, which axis is generally perpendicular to the plane containing the wider axis and the narrower axis of the body; and
(c) the elongated handle is arranged substantially perpendicular to the rotation axis and extends substantially continuously across the axis.

\* \* \* \* \*

UNITED STATES PATENT AND TRADEMARK OFFICE
CERTIFICATE OF CORRECTION

PATENT NO.         : 7,517,117 B2                              Page 1 of 1
APPLICATION NO. : 10/647726
DATED              : April 14, 2009
INVENTOR(S)        : Karren Moreland et al.

It is certified that error appears in the above-identified patent and that said Letters Patent is hereby corrected as shown below:

Column 4, line 27 (Claim 1) after parallel, insert --to--
Column 4, line 28 (Claim 1) delete the first "to"
Column 4, line 31 (Claim 1) after parallel, insert --to--
Column 4, line 31 (Claim 1) delete "to" that comes after "slot of"
Column 4, line 65 (Claim 6) replace "to enable the body to pass through the slot when the wider axis is parallel to the longitudinal slot," with --, one edge at each opposing end of the body,--
Column 6, line 26 (Claim 13) after "body" insert --,-- (1st occurrence)

Signed and Sealed this

First Day of June, 2010

David J. Kappos
*Director of the United States Patent and Trademark Office*